Figure 1:
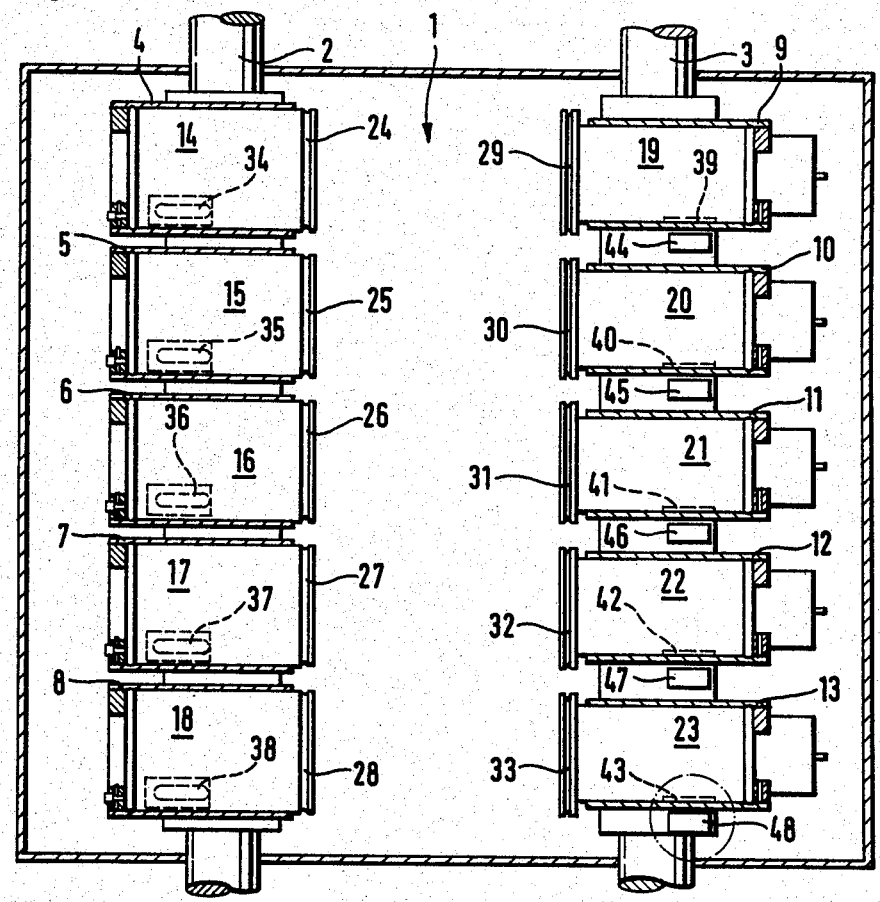

United States Patent [19]

Flamme et al.

[11] Patent Number: 4,530,148

[45] Date of Patent: Jul. 23, 1985

[54] TOOL CHANGING MECHANISM

[75] Inventors: Walter Flamme, Wegberg-Beeckerheide; Oskar Rahn, Kempen, both of Fed. Rep. of Germany

[73] Assignee: L. Schuler GmbH, Fed. Rep. of Germany

[21] Appl. No.: 576,797

[22] Filed: Feb. 6, 1984

Related U.S. Application Data

[63] Continuation of Ser. No. 297,567, Aug. 31, 1981, abandoned.

[51] Int. Cl.³ .................... B23Q 3/157; B23D 35/00
[52] U.S. Cl. ........................................ 29/568; 72/446; 83/549
[58] Field of Search .................. 29/568, 26 A, 26 R; 72/446, 404; 83/549; 414/736, 738, 753

[56] References Cited

U.S. PATENT DOCUMENTS

| | | | |
|---|---|---|---|
| 3,128,645 | 4/1964 | Anthony | 29/568 |
| 3,163,291 | 12/1964 | Gleisner, Jr. | 29/568 |
| 3,173,204 | 3/1965 | Anthony | 29/568 |
| 3,249,997 | 5/1966 | Hutchens | 29/568 |
| 3,745,646 | 7/1973 | Kristiansson | 72/446 X |
| 3,760,489 | 9/1973 | Griffith | 29/568 |
| 3,816,904 | 6/1974 | Herb | 29/568 |
| 4,188,815 | 2/1980 | Mizushima | 72/446 |
| 4,304,041 | 12/1981 | Kline et al. | 83/549 X |
| 4,387,502 | 6/1983 | Dom | 29/568 |

FOREIGN PATENT DOCUMENTS 772802 10/1980 U.S.S.R. ........................ 29/568

Primary Examiner—William R. Briggs
Attorney, Agent, or Firm—Craig and Burns

[57] ABSTRACT

A tool changing mechanism for an automatic changing of tools for a press ram and die of a forming press such as a multistage metal forming press. The tool changing mechanism includes a magazine having holders for accommodating individual tools. The individual tools have different codings and the holders have electrical or electronic code reading devices associated therewith and connected to a comparator for comparing the codes measured or read by the code reading devices with the preset code means in the comparator. Upon a deviation of a measured code from the preset coding in the comparator, the comparator provides an indication of the deviation by transmitting an error signal so as to enable an avoiding of the occurrence or errors in the filling or charging of the magazine with tools. The code reading device may be constructed as series-type limit switches operating without contact and the codes on the respective tools may be fashioned as indentations or recesses provided in the tools.

21 Claims, 2 Drawing Figures

TOOL CHANGING MECHANISM

This is a continuation of application Ser. No. 297,567, filed Aug. 31, 1981, now abandoned.

The present invention relates to a press arrangement and, more particularly, to a tool changing mechanism for a forming press, especially a multistage press which includes a magazine having tools stored in springs therein. The mechanism is adapted to automatically change the tools for the press ram and die of the press.

In, for example, U.S. Pat. No. 4,205,427, a multistage forming press is proposed which includes an automatic tool changing mechanism for changing the press ram tools and the die tools. The tool changing mechanism disclosed therein includes a movably suspended gripper arm in a magazine, wherein the tools which may have to be utilized in subsequent forming operations are kept ready in fitting holders or chucks. In this proposed construction, during a tool changing operation, the tool to be changed is withdrawn from the press ram or die mounting means by the gripper arms and replaced by a tool from the magazine.

In press constructions, for the sake of simplicity and also to avoid any confusion, the tools used during the press operation are seated in the magazine in the same arrangement as in the press proper. However, errors may occur when charging or filling the magazine with new tools or with a new tool set and, if such errors go unrecognized by operating personnel, the errors may result in not only a damaging of the tools but also a damaging of the press itself when the incorrect tools are subsequently improperly inserted and used in the press.

The aim underlying the present invention essentially resides in providing a tool changing mechanism for enabling an automatic tool change in a forming press, with the tool changing mechanism including means which aids or assists in avoiding the occurrence of errors in the charging or filling of tools in a magazine of the tool changing mechanism.

In accordance with advantageous features of the present invention, the tools for the press exhibit or are provided with different codes and the holders exhibit electrical or electronic code readers connected to a comparator for comparing the codes, read or sensed by the code reader, with preset codings. The comparator provides a spurious or error output signal upon the deviation of the read or sensed coding from the preset coding.

By virtue of the above noted features of the present invention, an electric of electronic control means is provided whereby errors in the charging or filling or tools into the magazine may for all practical purposes be entirely avoided since in the case of erroneous charging or filling a spurious or error signal indication immediately takes place. As can readily be appreciated, the input of the preset coding into the comparator may be effected, in a conventional manner, by a corresponding programming in such a way so as to exclude occurrence of any errors.

In accordance with further features of the present invention, the preseting of the codes in the comparator is adjustable so as to enable the control means to be readily reset to other tool sets. In this connection, the preseting of the code should be changeable or adjustable only for an entire tool set so that errors cannot occur in the sequence of the tools in any given tool set.

To further enhance or increase the prevention of the occurrence of errors in the charging or filling of the magazine of the tool changing mechanism, advantageously in accordance with the present invention, the comparator additionally includes a release or clearance indicator means releasing the mechanism so as to enable a subsequent tool changing.

The code reading device may be of the type disclosed, for example, in Auslegeschrift No. 1,427,039 or U.S. Pat. No. 3,173,203. Additionally, the code reading device may take the form of a code reader operating without contact such as, for example, proposed in German Patent No. 1,552,431 or British Patent No. 119,060. The code reading device may also be series-type or multiple limit switches operating without contact. Series-type limit switches are disclosed in, for example, a prospectus entitled *Precision-Bellauff-Inductive Proximity Switches,* February, 1980, pgs 36–41 and *Siemens Catalog ST*11, 1977, pgs. 2/52–2/56. The use of series-type limit switches such as proposed in the prior art are advantageous since such switches have proven themselves very well in operation by reliable performance.

Advantageously, codes for the respective tools may be fashioned or constructed as indentations in the tools. The indentations or recesses may also be fashioned as index discs set into the tool, with holes in the disc constituting or forming the coding for the respective tools.

Accordingly, it is an object of the present invention to provide a tool changing mechanism for an automatic tool change in a forming press which avoids, by simple means, shortcomings and disadvantages encountered in the prior art.

Another object of the present invention resides in providing a tool changing mechanism for an automatic tool change in a forming press which minimizes if not avoids the occurrence of erroneous filling or supplying of tools to the press.

A further object of the present invention resides in providing a tool changing mechanism for an automatic tool change in a forming press wherein matched pairs of tools are stored in the same general arrangement in a magazine as they are used in the forming press.

A still further object of the present invention resides in providing a tool changing mechanism for an automatic tool change in a forming press which is simple in construction and therefore relatively inexpensive to manufacture.

Another object of the present invention resides in providing a tool changing mechanism for an automatic tool change in a forming press which functions reliably under all operating conditions of the press.

Figure 2:
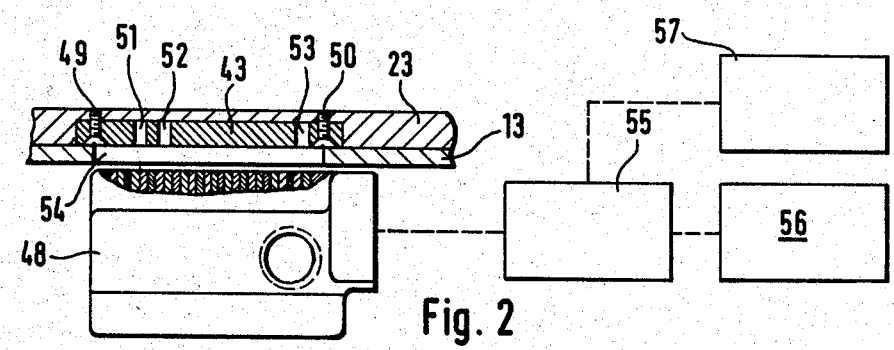

These and other objects, features, and advantages of the present invention will become more apparent from the following description when taken in connection with the accompanying drawing which shows, for the purposes of illustration only, one embodiment in accordance with the present invention, and wherein:

FIG. 1 is a lateral view of a magazine of a tool changing mechanism constructed in accordance with the present invention for a forming press; and FIG. 2 is a partially schematic longitudinal cross sectional view through a holder of the magazine of FIG. 1.

Referring now to the drawings wherein like reference numerals are used in both views to designate like parts and, more particularly, to FIG. 1, according to this figure, a tool changing mechanism for a forming press includes a magazine generally designated by the reference numeral 1. The forming press (not shown) and the gripper (not shown) of the tool changing mechanism may be of the type disclosed in, for example, the above-mentioned U.S. Pat. No. 4,205,427.

The magazine 1 includes two holder columns 2, 3, each with five tubular holders 4, 5, 6, 7, 8 and 9, 10, 11, 12, 13, respectively, attached to the respective column 2, 3, one below the other.

The arrangement of the holders 4–8 and 9–13, respectively, is identical to the corresponding tool chucks (not shown) in the forming press. As apparent from the number of holders 4–8 and 9–13 illustrated in FIG. 1, the forming press is a five stage press.

Tools 14, 15, 16, 17, 18 are respectively accommodated in tubular holders 4, 5, 6, 7, 8, and tools 19, 20, 21, 22, 23, are respectively accommodated in the tubular holders 9, 10, 11, 12, 13. In FIG. 1, the tools 14–18 represent die tools, while the tools 19–23 on the right hand side of the Figure represent tools associated with the press ram. This arrangement of the respective pairs of tools represents the same general arrangement of the tools as the arrangement of the tools when they are installed and used in the press. Each of the tools 14–28 are respectively provided with annular grooves 24–33 at their projecting ends. The annular grooves 24–33 are engageable by the gripper of a gripper arm (not shown) so as to enable the gripper to pull the respective tools 14–23 from the holders 4–13.

Coding plates 34–43 are respectively set into a jacket of each of the tools 14–23, with the coding plates 34–43, when a tool 14–23 is fully inserted, being respectively disposed in opposition to a series-limit switch of conventional construction. In FIG. 1, only the switches 44–48 attached to the right hand holder column 3 are visible; however, it is understood that switches are also provided on the left-hand holder column 3.

FIG. 2 provides an illustration of an exact construction of the coding plates 34–43 and the series-type limit switches 44–48. More particularly, as shown in FIG. 2, which represents a longitudinal cross sectional view of a portion of the tubular holder 13 in the area of the phantom circle in FIG. 1, an outer wall of the tool 23 has set therein a coding plate 43 fastened by way of two countersunk fasteners such as screws or bolts 49, 50. The coding on the coding plates 44–48 are formed of bores which may have a varying arrangement. In the illustrated example of FIG. 2, three bores 51, 52, 53 are provided each of which have a different mutual spacing.

The holder 13 includes a passage slot 54 in a zone of the coding plate 43. Forwardly of the passage slot 54 and attached outside of the holder 13 is the series-type limit switch 48, of conventional construction. The series-type limit switch 48 produces high frequency alternating fields oriented toward the coding plate 43, with the fields reacting with a voltage rise to the holes 51, 52, 53 since no energy is removed at those points. Thus, the series-type limit switch 48 can "read" the coding represented by the presence of the bores 51, 52, 53 by a conversion into electrical voltage changes.

The "read out" result from the series-type limit switch 48 is transferred to an electronic comparator 58 which, for example, may be of the type described in *Siemens Catalog ST* 11, 1977, pgs. 2/57–2/59. The comparator 55 is, in turn, connected to a coding switch 56 which may be of the type for example, disclosed in, for example, a prospectus entitled "*Introducing The Two-Faced Switch,* by Electronic Engineering Company of California. The coding for the desired tools to be used may be set at the coding switch 56 by feeding the coding of the respective tools into the switch 56. By an appropriate programming, care may be taken that a set of tools can be introduced only in the correct sequence and the associated ram and die tools can be introduced only if they mutually fit together.

The input values from the coding switch 56 are then fed to the comparator 55 and compared with actual values measured by the series-type limit switches, e.g., 44–48. If the measured coding data provided by the limit switches, such as, 44–48 corresponds to the preset coding data of the coding switch 56, then the individual tools 14–23 are respectively seated in the correct holders 4–13. An indicator means 57 connected to the comparator 55 transmits a release signal upon the occurrence of correspondence between the measured coding data and the preset coding data.

If deviations are detected between the measured coding values obtained by the switches, only switches 44–48 shown, and the preset coding values of the coding switch 56, when, for example, at least one tool 14–23 is not correctly seated in the proper holder 4–13 or when at least one tool does not belong in the magazine, the indicator means 57 transmits an error or spurious signal whereby, through circuitry of conventional construction and an error signal identifying means, the erroneously inserted tool can then immediately be identified. In this manner, the magazine 1 is always correctly filled with certainty so that no damage can occur to the tools as well as the forming press proper.

While we have shown and described only one embodiment in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. A tool changing mechanism for an automatic changing of male and female tools of a forming press having a gripper arm with two grippers arranged opposite to each other, which arm changes tools between corresponding positions in a magazine and the press, comprising a magazine having a plurality of tool holders arranged in pairs and straight rows in the same arrangement as in the press, each of the male and female tools including different codings and each corresponding holder in the magazine having coding reading means which are connected to a comparator for comparing the codings read by the coding reading means with preset codings, the comparator being provided with an indicator for emitting an error signal if the read coding deviates from the preset coding.

2. A tool changing mechanism according to claim 1, wherein the plurality of holders includes at least two pairs of holder means and the set of tools includes matched pairs of tools, the number of pairs of tools corresponding to the number of pairs of holder means, each of said pairs of holder means being adapted to accommodate a matched pair of tools.

3. A tool changing mechanism according to claim 1, wherein the mechanism includes means for adjusting the preset codings in the comparator.

4. A tool changing mechanism according to claim 3, wherein the means for adjusting is adapted to be adjusted only for an entire set of tools.

5. A tool changing mechanism according to claim 1, wherein the mechanism includes means for transmitting a tool release signal when codings read by the coding reading means correspond to the preset codings.

6. A tool changing mechanism according to claim 5, wherein the coding reading means includes a plurality of limit switch means arranged at the respective tool holders.

7. A tool changing mechanism according to claim 6, wherein said coding reading means includes a plurality of limit switch means adapted to read the respective codings without contacting the coding.

8. A tool changing mechanism according to claim 7, wherein the coding includes at least one identifying indentation means provided in the respective tools.

9. A tool changing mechanism according to claim 8, wherein said coding includes indentation means formed by an index plate set into each of the respective tools, each said index plate including at least one hole forming a coding for the respective tool.

10. A tool changing mechanism according to claim 3, wherein the means for adjusting the preset codings in the comparator includes a programmable coding switch.

11. A tool changing mechanism according to claim 1, wherein the coding reading means includes a plurality of limit switch means arranged at the respective tool holders.

12. A tool changing mechanism according to claim 11, wherein the limit switch means are adapted to read the respective codings without contacting the coding.

13. A tool changing mechanism according to claim 3, wherein the mechanism includes means for transmitting a tool release signal when codings read by the coding reading means correspond to the preset codings.

14. A tool changing mechanism according to claim 3, wherein the coding reading means includes a plurality of limit switch means arranged at the respective tool holders.

15. A tool changing mechanism according to claim 4, wherein the coding reading means includes a plurality of limit switch means arranged at the respective tool holders.

16. A tool changing mechanism according to claim 14, wherein said coding reading means includes a plurality of limit switch means adapted to read the respective codings without contacting the coding.

17. A tool changing mechanism according to claim 15, wherein said coding reading means includes a plurality of limit switch means adapted to read the respective codings without contacting the coding.

18. A tool changing mechanism according to claim 16, wherein the coding includes at least one identifying indentation means provided in the respective tools.

19. A tool changing mechanism according to claim 17, wherein each coding includes at least one identifying indentation means provided in the respective tool.

20. A tool changing mechanism according to claim 18, wherein each said coding includes indentation means formed by an index plate set into the respective tools, said index plate including at least one hole forming a code for the respective tools.

21. A tool changing mechanism according to claim 19, wherein each said coding includes indentation means formed by an index plate set into the respective tools, said index plate including at least one hole forming a code for the respective tools.

* * * * *